United States Patent [19]

Freeman et al.

[11] 3,927,462
[45] Dec. 23, 1975

[54] METHOD AND APPARATUS FOR REMOVING PLUNGERS FROM PISTON ASSEMBLIES

[75] Inventors: William H. Freeman; Herschel M. Williamson, both of Joliet, Ill.

[73] Assignee: Caterpillar Tractor Co., Peoria, Ill.

[22] Filed: Mar. 3, 1975

[21] Appl. No.: 555,003

[52] U.S. Cl. .................. 29/427; 29/244; 29/252; 29/282
[51] Int. Cl.² ............................... B23P 19/02
[58] Field of Search ............ 29/427, 244, 252, 282, 29/283, 200 D, 200 R, 200 J, 200 P, 403, 464, 467, 251, 426; 254/93 R; 269/20, 27, 32, 35

[56] References Cited
UNITED STATES PATENTS

| | | | |
|---|---|---|---|
| 2,228,086 | 1/1941 | Rodgers | 29/252 X |
| 3,104,459 | 9/1963 | Wendt | 29/252 |
| 3,648,352 | 3/1972 | Simmonds | 29/427 |
| 3,772,759 | 11/1973 | Bunyan | 29/252 |

Primary Examiner—Carl E. Hall
Assistant Examiner—James R. Duzan
Attorney, Agent, or Firm—Eugene C. Goodale

[57] ABSTRACT

The method and apparatus described permits the removal of plungers and press fit inserts from piston assemblies when leakage occurs therebetween. A piston assembly is placed on a complementally formed adapter member. A cap or cover is placed over the opposite end of the piston assembly and secured to the adapter member. Hydraulic means urge the plunger and insert into a cavity within the cap.

10 Claims, 6 Drawing Figures

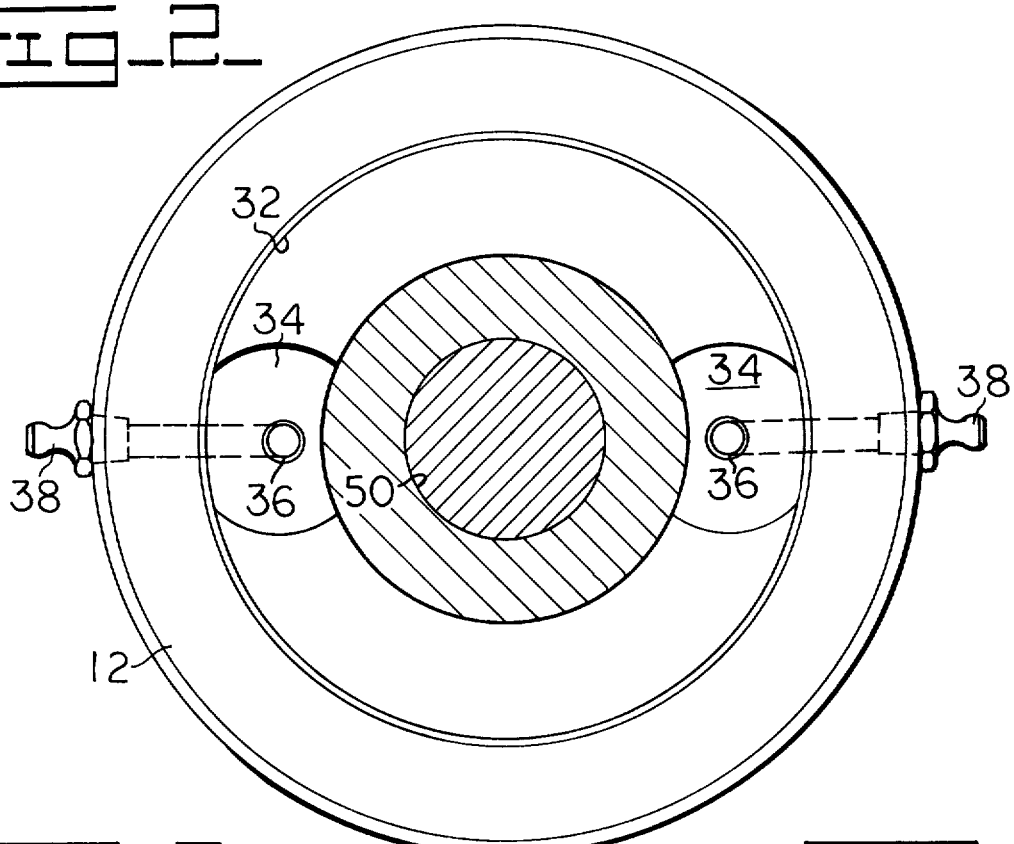
Fig_2_
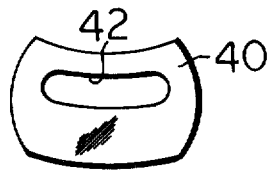
Fig_3_
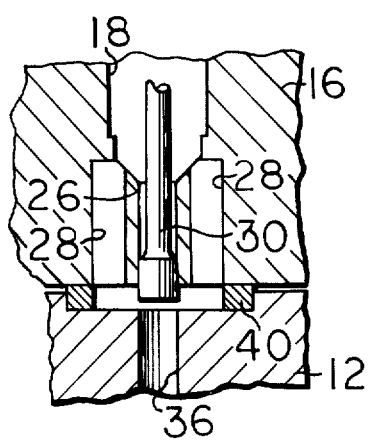
Fig_4_
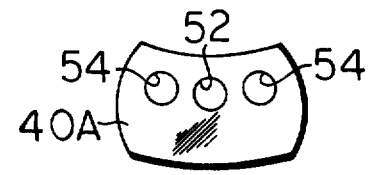
Fig_5_
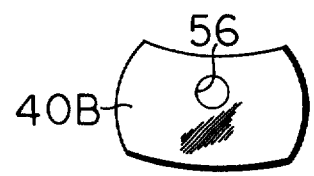
Fig_6_

METHOD AND APPARATUS FOR REMOVING PLUNGERS FROM PISTON ASSEMBLIES

BACKGROUND OF THE INVENTION

This invention relates generally to piston repairing equipment, and more particularly to a method and apparatus for removing plungers from piston assemblies.

In order to have efficient operation of piston assemblies, it is essential that there be practically no leakage around the plungers therein. Although the respective plungers, spacers and inserts all undergo quality control inspection, occasionally a part having a nick or burr will be used in assembling a piston. When this occurs, leakage will occur during operation. In the past, it has been difficult to salvage the piston body. The inserts are press fit into the piston body such that they are very difficult to remove. Historically, there has been no effective tool with which to remove these components without damaging the piston.

Accordingly, it is an object of this invention to provide a safe, simple and efficient method for removing plungers from piston assemblies.

A further object of this invention is to provide a simple and efficient apparatus which will permit the removal of plungers from piston assemblies.

A still further object of this invention is to provide an apparatus which will urge an insert and plunger out of a piston assembly and provide a collection chamber for the parts urged therefrom.

SUMMARY OF THE INVENTION

The method and apparatus of this invention permits an operator to remove the plunger and insert from a piston assembly. A base member is formed to complementally receive a piston assembly thereon. Means is provided to secure the piston to the base member. Ports in the base member communicate with similar ports in the piston assembly wherein hydraulic pressure is applied to the plunger and insert such that said plunger and insert are forced out of the piston. Seal means are provided between the base member and piston.

Other objects, details, uses and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention in which:

FIG. 2 is a top view of the base member of the apparatus of FIG. 1;

FIG. 3 is a top view of the seal used between the base member and piston assembly;

FIG. 4 is a fragmentary sectional view taken along the line 4—4 of FIG. 1; and

FIGS. 5-6 show other configurations of the seal of FIG. 3.

DESCRIPTION OF ILLUSTRATED EMBODIMENTS

Figure 1:
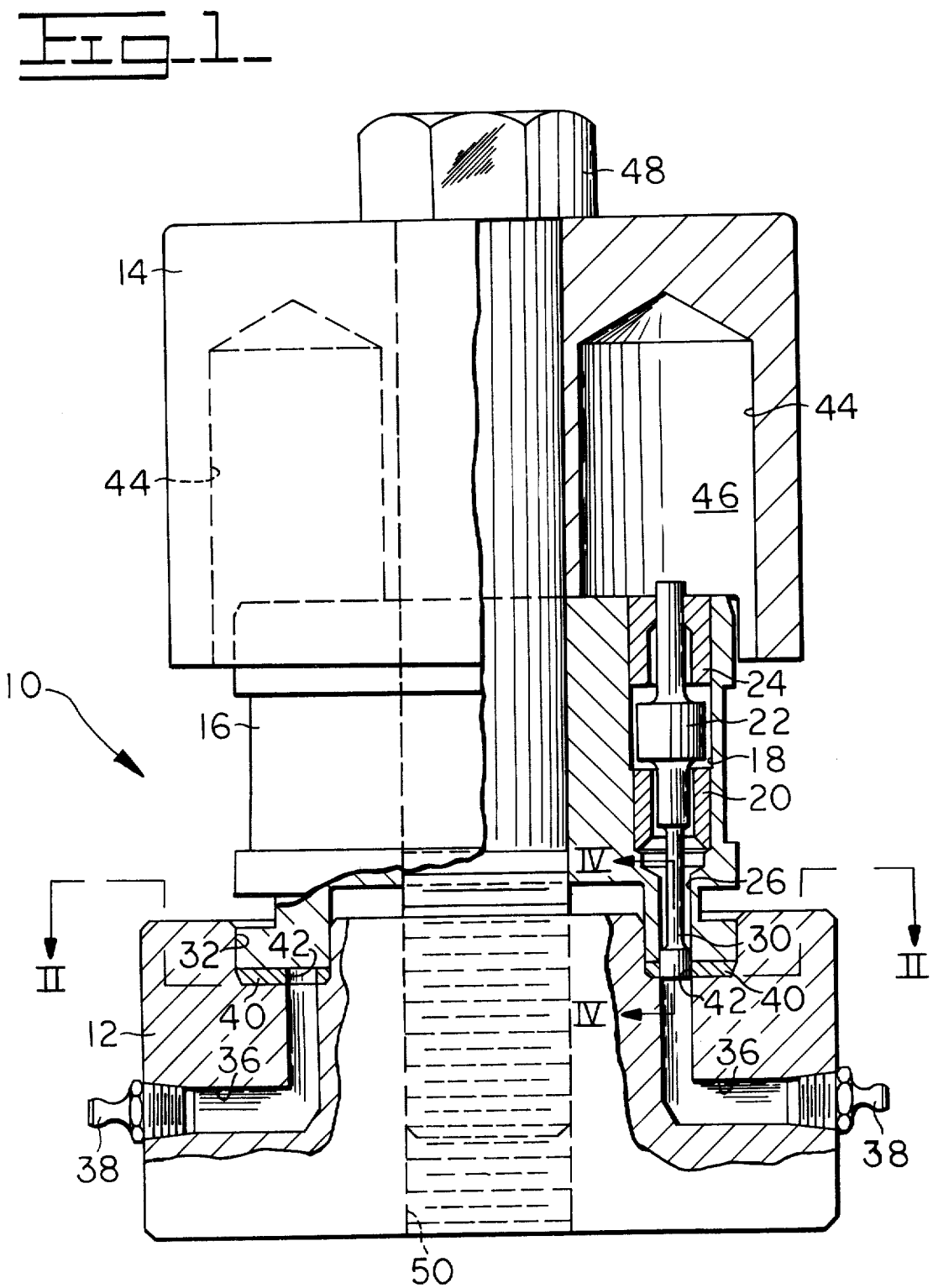
FIG. 1 is an elevational view, partially in section, of the apparatus of this invention in operating condition with a piston assembly.

Reference is now made to FIG. 1 of the drawings which illustrates one exemplary embodiment of the plunger removing apparatus of this invention which is designated generally by the reference numeral 10. The apparatus is comprised of a base member 12 and a cap or cover 14 between which a piston 16 is secured.

The piston 16 is formed with a pair of bores 18 of which one is shown in FIG. 1. The bore 18 terminates in communicating fashion with a smaller diameter bore 26 such that there is an axial passage completely through the piston 16. In assembling the piston 16, a spacer 20 is press fit into the bore 18, a plunger 22 is then inserted, and finally an insert 24 is press fit into the end of the bore 18. The spacer 20 and insert 24 have bores therethrough such that the plunger has limited axial movement within the bore 18. The plunger stem 30 projects downwardly through the bore 26 in a normal fashion. A pair of side bores or ports 28 (FIG. 4) are formed in the piston 16 so as to terminate in communicating fashion with bore 18.

As seen in FIGS. 1 and 2, the base member 12 is formed with a counterbore channel 32. Seats 34 are formed 180 degrees apart in the counterbore 32. A bore or channel 36 extends from the peripheral wall of the base member 12 and terminates in the seat 34 so as to be in axial alignment with the bore 26 of the piston 16. Grease fittings 38 are secured in communicating fashion with the bores 36 at the peripheral edge of the base 12.

Suitable gasket or seal means 40 are placed within each seat 34. As seen in FIG. 3, the seal 40 is formed with an elongated aperture 42 therethrough. Thus, when a piston 16 is placed on the base member 12, the substantially elongated aperture 42 will be in communication with the respective piston bores 26 and 28. As seen in FIG. 4, the seal 40 is of a thickness slightly greater than the depth of the seat 34. This insures that a good sealing contact is made with the piston 16. The seal 40 may be of any suitable material which will provide good sealing qualities when subject to very high pressures. An example of such material is annealed copper.

The cap 14 is provided with a pair of bores 44 which define chambers 46 therein. The chambers 46 communicate with the piston bores 18 when the cap 14 is placed over the end of the piston.

The piston 16 is securely held between the base member 12 and cap 14 by any suitable means. In the illustrative embodiment herein described, a bolt or the like 48 passes through bores in the cap 14 and piston 16 and threadably engages threaded bore 50 in the base member 12. When the piston 16 is thus secured, one or both of the grease fittings 38 are connected to a source of hydraulic pressure such as a grease supply (not shown).

In operation, grease is transmitted through the bore 36 and against the end of the stem 30. The pressure of the grease will urge the plunger 22 upwardly until the end of the stem 30 clears the lower surface of the seal 40, as seen in FIG. 4. At this point, the grease will travel outwardly along the elongated aperture 44 and upwardly into the bores 28 and into bore 18. The grease will continue to urge the plunger upwardly and grease may pass around the end of the stem 30 and through the bore 26 into bore 18. The plunger 22 will continue to move upwardly into seating contact with insert 24 and thereafter the grease will fill all the available air space within the bore 18. It may be noted that the grease is of such a consistency that very little leakage will occur between the plunger 22 and insert 24 thereby permitting the pressure to build up. More pressure is then applied to the grease which acts against the plunger 22 and insert 24 thereby forcing the plunger and insert out of the piston 16 and into the chamber area 46. The cover 14 and chamber 46 provide a safe means for collecting the expelled insert 24 and plunger 22 even when extremely high pressures are being used. Pressures up to approximately 10,000 psi can be produced if needed for the removal of the plunger and insert from the piston body.

Although the preferred embodiment has been shown with the seal 40 having an elongated aperture 42, it is apparent that other configurations of the seal may be utilized. As an example, in FIG. 5, the seal 40A is formed with a center aperture 52 which communicates with the piston bore 26. Side apertures 54 communicate with the respective side bores 28 of the piston 16. Suitable passageways between bore 36 and apertures 54 would be provided in the base member 12 in this embodiment. Another configuration of the seal is shown in FIG. 6 in which the seal 40B is seen to have only a single aperture 56 therethrough. The aperture 56 thus provides communication between the bore 36 and bore 26.

It may thus be seen that a safe, simple and efficient method and apparatus for removing plungers from piston assemblies has been described. Accordingly, the objectives hereinbefore set forth have been accomplished.

While present exemplary embodiments of this invention have been illustrated and described, it will be recognized that this invention may be otherwise variously embodied and practiced by those skilled in the art.

What is claimed is:

1. A method for removing plungers and press fit inserts from a piston assembly, said method comprising:

positioning a piston assembly on a complementally formed base member;
   aligning the piston assembly so that the plunger bores are axially aligned with corresponding supply bores in the base member;
   securing the piston assembly on the base member; and
   injecting a hydraulic medium through the base member bore and into the piston assembly plunger bore wherein the hydraulic pressure generated by the hydraulic medium on the plunger and insert will urge the plunger and insert out of the piston assembly.

2. The method as set forth in claim 1 further comprising placing a sealing element between the piston assembly and base member, said sealing member being formed with an aperture therethrough to provide communication between the base member bore and piston assembly plunger bore.

3. The method as set forth in claim 1 in which said securing step comprises placing a cover over the top of the piston assembly and connecting the cover with the base member to securedly fix the piston assembly therebetween.

4. The method as set forth in claim 2 in which said securing step comprises placing a cover over the top of the piston assembly and connecting the cover with the base member to securedly fix the piston assembly therebetween.

5. Apparatus for removing plungers and press fit inserts from a piston assembly plunger bore comprising:

a base member;
   complementally formed piston receiving means in said base member;
   said base member being formed with at least one supply bore which terminates at one end in said piston receiving means; and
   means securing the piston assembly in operative connection with said piston receiving means such that the piston plunger bore is aligned with said base member supply bore wherein a hydraulic medium supplied through said supply bore will urge the piston and press fit insert out of the piston plunger bore.

6. The apparatus as set forth in claim 5 further comprising a seal placed between said piston receiving means and the piston assembly, said seal being formed with an aperture therethrough and providing communication between said supply bore and the piston plunger bore and wherein said seal prevents leakage of the hydraulic medium.

7. The apparatus as set forth in claim 5 in which said securing means includes a cover placed over the top of the piston assembly, said cover being formed with a bore extending from the piston engaging surface partially through the cover, said cover bore receiving the plunger and press fit insert and the hydraulic medium when said insert and plunger are discharged from the piston assembly.

8. The apparatus as set forth in claim 7 further comprising a seal placed between said piston receiving means and the piston assembly, said seal being formed with an aperture therethrough and providing communication between said supply bore and the piston plunger bore and wherein said seal prevents leakage of the hydraulic medium.

9. The apparatus as set forth in claim 8 in which said seal is annealed copper.

10. The apparatus as set forth in claim 9 in which said piston receiving means is a counterbore channel formed in the top of said base member, and in which said seal is placed on the bottom surface of said counterbore channel.

* * * * *